United States Patent
Takahashi

(10) Patent No.: US 9,026,135 B2
(45) Date of Patent: May 5, 2015

(54) MOBILE TERMINAL DEVICE AND POSITIONING METHOD

(75) Inventor: Makoto Takahashi, Yokosuka (JP)

(73) Assignee: NTT DOCOMO, INC., Chiyoda-ku, Tokyo (JP)

( * ) Notice: Subject to any disclaimer, the term of this patent is extended or adjusted under 35 U.S.C. 154(b) by 292 days.

(21) Appl. No.: 13/641,019

(22) PCT Filed: Apr. 11, 2011

(86) PCT No.: PCT/JP2011/002130
§ 371 (c)(1),
(2), (4) Date: Oct. 12, 2012

(87) PCT Pub. No.: WO2011/129092
PCT Pub. Date: Oct. 20, 2011

(65) Prior Publication Data
US 2013/0035112 A1  Feb. 7, 2013

(30) Foreign Application Priority Data
Apr. 14, 2010 (JP) ................................. 2010-093061

(51) Int. Cl.
*H04W 4/02* (2009.01)
*H04W 4/04* (2009.01)
(Continued)

(52) U.S. Cl.
CPC *G01S 19/34* (2013.01); *G01S 19/25* (2013.01)

(58) Field of Classification Search
CPC ....... H04W 64/00; H04W 24/00; H04W 4/02; G01S 19/25; G01S 19/46; G01S 19/48; G01S 5/0252
USPC .............................................. 455/456.1–457
See application file for complete search history.

(56) References Cited

U.S. PATENT DOCUMENTS 6,389,291 B1 * 5/2002 Pande et al. ................ 455/456.5
6,427,120 B1 * 7/2002 Garin et al. .................... 701/483
(Continued)

FOREIGN PATENT DOCUMENTS

JP   2002-196063 A   7/2002
JP   2004-347570 A   12/2004
(Continued)

OTHER PUBLICATIONS

Japanese Office Action dated May 28, 2013 with English translation (Six (6) pages).
(Continued)

*Primary Examiner* — Matthew Sams
(74) *Attorney, Agent, or Firm* — Crowell & Moring LLP

(57) ABSTRACT

There are provided a mobile terminal device and a positioning method, in which power saving is enabled. When an environment estimating unit determines that the mobile terminal device is currently located in an indoor environment, an autonomous GPS positioning regulating unit thereof regulates implementation of an autonomous positioning operation by an autonomous GPS positioning unit to enable the suppression of wasteful power consumption caused by the implementation of the autonomous GPS positioning operation that has no possibility of being successful at a current time. In the meanwhile, an assist information acquiring processing unit of an A-GPS positioning unit is made to perform an assist information acquiring process that is a former process of the A-GPS positioning operation. When the location accuracy of outline location information acquired has a good result of a level 3 or higher, the outline location information is provided as a positioning result.

5 Claims, 2 Drawing Sheets

(51) Int. Cl.
*H04W 24/02* (2009.01)
*H04W 64/00* (2009.01)
*G01S 19/48* (2010.01)
*G01S 19/34* (2010.01)
*G01S 19/25* (2010.01)

(56) References Cited

U.S. PATENT DOCUMENTS

| | | | |
|---|---|---|---|
| 6,684,158 B1* | 1/2004 | Garin et al. | 701/470 |
| 7,076,256 B1* | 7/2006 | Orler et al. | 455/456.1 |
| 7,432,923 B2 | 10/2008 | Fujiwara et al. | |
| 7,970,411 B2* | 6/2011 | Pande et al. | 455/456.1 |
| 7,970,412 B2* | 6/2011 | Pande et al. | 455/456.1 |
| 2002/0086684 A1* | 7/2002 | Pande et al. | 455/456 |
| 2002/0116124 A1* | 8/2002 | Garin et al. | 701/213 |
| 2005/0062643 A1* | 3/2005 | Pande et al. | 342/357.1 |
| 2006/0038719 A1* | 2/2006 | Pande et al. | 342/357.12 |
| 2007/0049295 A1* | 3/2007 | Soliman et al. | 455/456.3 |
| 2010/0007552 A1* | 1/2010 | Oda et al. | 342/357.09 |
| 2012/0058775 A1* | 3/2012 | Dupray et al. | 455/456.1 |

FOREIGN PATENT DOCUMENTS

| | | |
|---|---|---|
| JP | 4240216 B2 | 3/2005 |
| JP | 2008-505313 A | 2/2008 |
| JP | 2009-115573 A | 5/2009 |
| JP | 2009-147876 A | 7/2009 |
| JP | 4312233 B2 | 8/2009 |
| JP | 2010-38895 A | 2/2010 |
| JP | 2010-054450 A | 3/2010 |
| WO | WO 2007/025151 A2 | 3/2007 |

OTHER PUBLICATIONS

Mobile+Views of Hisashi Kamio (w/English translation), 2009, 6 pages total.
PCT/JP2011/002130 PCT/IB/338, dated Nov. 15, 2012, 1 page.
PCT/JP2011/002130 PCT/IB/373, dated Nov. 6, 2012, 1 page.
PCT/JP2011/002130 PCT/ISA/237 (Translation), dated May 17, 2011, 5 pages.
Chinese Office Action dated Jul. 31, 2013, with English translation (Fifteen (15) pages).
Japanese Office Action dated Sep. 10, 2013, with English translation (Six (6) pages).
Mobile+Views of Hisashi Kamio, 2009, 4 pages.
PCT/JP2011/002130 PCT(ISA/210, dated May 17, 2011, 2 pages.
Dovis et al., "An Assisted High-Sensitivity Acquisition Technique for GPS Indoor Positioning", Proceedings of IEEE/ION PLANS 2008, The Institute of Navigation, 8551 Rixlew Lane Suite 360 Manassas, VA 20109, USA, May 8, 2008, pp. 1350-1361.
European Search Report dated Jun. 30, 2014 (Eight (8) pages).

* cited by examiner

MOBILE TERMINAL DEVICE AND POSITIONING METHOD

TECHNICAL FIELD

The present invention relates to a mobile terminal device and a positioning method, and in particular, to a mobile terminal device and a positioning method, in which power saving is enabled.

BACKGROUND ART

In recent years, the technique of equipping a positioning function unit in a mobile terminal device as represented by, for example, a mobile telephone is becoming widely used.

In such a positioning function unit in the above-described mobile terminal device, a technique of selectively applying a different positioning method depending on the situation is employed.

At present, as positioning methods applied to the mobile terminal devices, there are a navigation message (such as Almanac and Ephemeris) held on the network side, the GSP time, A-GPS positioning operation by using assist information including outline location information and the like of the mobile terminal device, and autonomous GPS positioning operation for all of the positioning operations on the mobile terminal device side by receiving the positioning information from a GPS satellite without using the above-described assist information.

Specifically, the A-GPS positioning operation is a positioning method of network support type by using the assist information from the network side. The A-GPS positioning operation includes: a so-called UE-Assisted (or MS-Assisted) method in which a positioning server on the network performs processes including the final positioning operation process, and supplies results of the positioning operation process to the mobile terminal device; and a so-called UE-Based (or MS-Based) method in which the mobile terminal device performs the GPS positioning operation process by using the assist information acquired from the network.

Therefore, various technical proposals has already been made for improving specific functions, such as a reduction in the communication costs or availability of positioning operation under various environments, by adaptively switching the above-described multiple positioning methods.

For instance, in the network support type positioning system, the mobile terminal device needs to acquire the assist information via networks whenever it performs the positioning operation. However, since the traffic is increased for acquiring the assist information and the communication costs are increased, there is a proposal for a technique of focusing on such problems (for instance, see Patent Document 1).

In Patent Document 1, in order to reduce the communication costs, how the frequency of communication for acquiring the assist information is reduced is regarded as an importance issue. Accordingly, there is a proposal of reducing the communication costs of the network support type GPS terminal, by reducing the frequency of communication with the networks as much as possible even for acquiring the outline location state.

That is, in-area cell information, related to the outline location of the mobile terminal device, received by a communication unit in the first GPS positioning operation, is stored in a storage unit. In the second or later GPS positioning operation, only when the in-area cell information stored in the storage unit is different from that of the previous GPS positioning operation, the outline location information is acquired from the network. Then, the acquired outline location information is used for the GPS positioning operation and also stored in the storage unit. In the second or later GPS positioning operation, when the in-area cell information stored in the storage unit is same with that of the previous GPS positioning operation, the outline location stored in the storage unit is used for the GPS positioning operation, so that the frequency of acquiring the outline location information is reduced. As a result, the frequency of communication is reduced to reduce the communication costs.

In addition, there is a proposal for a technique in which multiple positioning methods are made selectively available. Even if one positioning method fails, another positioning method is selected so that an available method is used according to the condition to avoid the situation where the positioning operation is unavailable (for instance, see Patent Document 2).

In the mobile terminal device of Patent document 2, when the network support type positioning operation fails and the location information of the cell where the mobile terminal device is located is acquired in the course of positioning operation, supplementary cell ID positioning operation that is the positioning method of using this location information is performed to avoid the situation where the positioning operation is unavailable.

Additionally, in Patent Document 2, the network support type positioning operation has an advantage that the positioning time is short. However, data communication is needed for acquiring the information that is to be acquired. This causes a problem of placing increased burdens of the communication fees on users. Besides, there is a problem in that the GPS positioning operation cannot be performed in the area where the data communication is unavailable. Patent Document 2, however, discloses that the supplementary cell ID positioning operation can address the both problems.

Meanwhile, in recent years, a mobile communication system is operating for regularly and automatically acquiring in a background process positioning data that are the results of the GPS positioning operation process on the mobile communication device by use of the assist information, and notifying the acquired positioning data to a communication operator or a content delivery operator (for example, see Non-Patent Document 1).

In such a mobile communication system described in Non-Patent Document 1, a so-called push type information delivery service is provided such that the communication operator or the content delivery operator figures out the location of the mobile terminal device based upon the notified positioning data and delivers weather forecasts or town event information in accordance with the location of the current time.

In the mobile terminal device to which the above-described information delivery service by use of the positioning data is made available, while the GPS positioning function is equipped therein, it is devised such that the power consumption needed for the GPS positioning operation can be suppressed as much as possible.

That is to say, the mobile terminal device is provided with an acceleration sensor (walking detecting unit) or a detecting function unit for detecting an in-area sector ID corresponding to the located in-area. Those units acquire the information on the moving status of the mobile terminal device or the in-area history thereof in order to save the power by the frequency of operation of the GPS positioning operation.

This power-saving method will be described specifically as follows. Firstly, as a precondition of applying this method, basically, the GPS positioning operation is continuously performed on a regular basis. In this situation, in the procedure of the GPS positioning operation performed on a regular basis, the positioning operation is repeatedly performed on a predefined period defined by the time-keeping means of the mobile terminal device.

At the starting point of the positioning operation, a data processing engine of the mobile terminal device determines the validity of the assist information that has already been acquired. In this validity determination, when the acquired assist information is determined valid, the Autonomous positioning operation is performed based upon the positioning information received from the GPS satellite with the use of the acquired assist information, instead of acquiring the assist information from the network side once again.

On the other hand, when the acquired assist information is determined invalid, the A-GPS positioning operation is performed. The A-GPS positioning operation in this situation is performed in the following procedure. That is, firstly, a session is established with the network side. After the session establishment, the assist information is requested for the network side. As a response to the request, the assist information that is valid at the current time is acquired from the network side. Then, by use of the acquired assist information, the positioning operation is performed based upon the positioning information received from the GPS satellite.

The data of the positioning results acquired by performing the A-GPS positioning operation or the information on the fact that the positioning operation is impossible is notified to the network side. The session is released after this notification.

After that, while the above-described GPS positioning operation for continuously performing the GPS positioning operation on a regular basis is set as a basic GPS positioning operation, the GPS positioning operation is stopped when the acceleration sensor does not detect the continuous walking or when the mobile terminal device enters again the area where the already acquired in-area history is available. Then, the power consumption corresponding to the stopping in the positioning operation is suppressed by replacing the current positioning information with the already acquired positioning information.

PRIOR ART DOCUMENTS

Patent Documents

Patent Document 1: JP Patent Number 4312233 B
Patent Document 2: JP Patent Number 4240216 B Non-Patent Documents Non-Patent Document 1: Interviewee: Yoshiaki MAEDA (Interviewer: Hisashi KAMIO) "Mobile+Views of Hisashi KAMIO: "i-concier" shifts to new phase by automatic GPS" [online], updated at 15:44 on Nov. 16, 2009 (searched on April 2, Heisei 22), the Internet (URL: http://www.itmedia.co.jp/promobile/articles/0911/16/news052.html)

SUMMARY OF THE INVENTION

Problem to be Solved

It is to be noted that, however, the techniques described in the above-described Patent Document 1 and Patent Document 2 do not recognize the technical considerations for power saving in the mobile terminal device. Accordingly, it is natural that Patent Document 1 and Patent Document 2 do not disclose any measures of addressing the above technical considerations.

That is, although the mobile terminal device in Patent Document 1 is configured to be capable of selecting the positioning method in response to the request of "application" or the like, Patent Document 1 does not describe the content of the "application" at all, and besides, does not disclose at all in what way the positioning operation is performed in relation to the power saving.

Additionally, the technique of Patent Document 2 exclusively focuses on how the frequency of communication with the network is reduced to reduce the communication costs, and is considered to have reasonable effects only for this purpose. This is because the mobile terminal device disclosed in Patent Document 2 does not acquire the outline location (the assist situation) once again in the second or later GPS positioning operation, but utilizes the data in the previous GPS positioning operation. The fact remains that, however, basically the A-GPS positioning operation is repeatedly performed on a regular basis. Accordingly, the power for performing the A-GPS positioning operation, which is the most power-consuming positioning method, is consumed whenever the positioning operation is repeated. Hence, this technique is so insufficient in consideration of power saving.

On the other hand, the technique described in Non-Patent Document is configured to repeatedly perform the PGS positioning operation on a regular basis, basically. Although the GPS positioning operation is unavailable depending on the environment of the mobile terminal device at the time of performing the positioning operation, the GPS positioning operation is performed on a predefined period with certainty as long as the movement of the mobile terminal device is detected and the location thereof is not included in the history of positioning results. In such a case, the fact that the positioning operation fails is notified to the network side. However, the GPS positioning operation that consumes the power further more than other data processing is performed on the mobile terminal device. Therefore, even if the operation results are ineffective, an undesirable situation occurs that the power is wastefully consumed.

The present invention has been made in view of the above circumstances and has an object to provide a mobile terminal device and a positioning method, in which power saving is enabled more than a conventional mobile terminal device equipped with a GPS positioning function.

Solution to the Problem

In order to solve the above problems, the present invention proposes techniques of following aspects.

(1) There is provided a mobile terminal device capable of selectively performing a plurality of different positioning methods for acquiring location information of the mobile terminal device in a repeated manner, the mobile terminal device comprising:

a positioning timing base unit for giving a positioning timing base signal to be a basis for specifying a timing of performing each positioning operation, when the positioning operation is performed in the repeated manner;

a positioning result holding unit for at least temporarily holding positioning data corresponding to a result of the each positioning operation;

an A-GPS positioning unit for performing an A-GPS positioning operation at the timing in synchronization with the positioning timing base signal given by the positioning timing base unit, the A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

an autonomous GPS positioning unit for performing an autonomous GPS positioning operation without using the GPS assist information at the timing in synchronization with the positioning timing base signal given by the positioning timing base unit;

an environment estimating unit for estimating whether or not the mobile terminal device is currently located in an indoor environment or in an outdoor environment; and an autonomous GPS positioning regulating unit for regulating implementation of the autonomous GPS positioning operation by the autonomous GPS positioning unit to cause the A-GPS positioning unit to perform the assist information acquiring process of the A-GPS positioning operation, when the environment estimating unit estimates that the mobile terminal device is currently located in the indoor environment, and at a time after the estimation, when the positioning timing base unit gives the positioning timing base signal.

The mobile terminal device as described above (1) is capable of selectively performing a plurality of different positioning methods for acquiring location information of the mobile terminal device in a repeated manner.

Then, the positioning timing base unit gives the positioning timing base signal to be a basis for specifying a timing of performing each positioning operation, when the positioning operation is performed in the repeated manner.

In addition, the positioning result holding unit at least temporarily holds positioning data corresponding to a result of the each positioning operation.

Furthermore, the A-GPS positioning unit performs an A-GPS positioning operation at the timing in synchronization with the positioning timing base signal given by the positioning timing base unit, the A-GPS positioning operation including an assist information acquiring process for acquiring GPS assist information including outline location information of the mobile terminal device in communication with a base transceiver station, and a positioning operation process by use of the GPS assist information acquired by the assist information acquiring process.

Moreover, the environment estimating unit estimates whether or not the mobile terminal device is currently located in an indoor environment or in an outdoor environment.

Then, the autonomous GPS positioning regulating unit for regulating implementation of the autonomous GPS positioning operation by the autonomous GPS positioning unit to cause the A-GPS positioning unit to perform the assist information acquiring process of the A-GPS positioning operation, when the environment estimating unit estimates that the mobile terminal device is currently located in the indoor environment, and at a time after the estimation, when the positioning timing base unit gives the positioning timing base signal.

(2) The mobile terminal device according to (1) may further comprise: an assist information holding unit for holding the GPS assist information acquired by the assist information acquiring process by the A-GPS positioning unit;

an outline location information accuracy determining unit for determining whether or not accuracy of a location of the outline location information of the mobile terminal device included in the GPS assist information held by the assist information holding unit satisfies a predefined level; and a positioning operation process regulating unit for regulating implementation of the positioning operation process by the A-GPS positioning unit and causing the positioning result holding unit to hold as the positioning data the outline location information on which a positive determination is made by the outline location information accuracy determining unit, when the outline location information accuracy determining unit makes the positive determination, and at a time after the determination, when the positioning timing base unit gives the positioning timing base signal.

In the mobile terminal device as described above (2), according to the mobile terminal device (1), in particular, the assist information holding unit for holding, the outline location information accuracy determining unit, and the positioning operation process regulating unit are further provided.

Then, the assist information holding unit holds the GPS assist information acquired by the assist information acquiring process by the A-GPS positioning unit.

In addition, the outline location information accuracy determining unit determines whether or not accuracy of a location of the outline location information of the mobile terminal device included in the GPS assist information held by the assist information holding unit satisfies a predefined level.

Furthermore, the positioning operation process regulating unit regulates implementation of the positioning operation process by the A-GPS positioning unit and causing the positioning result holding unit to hold as the positioning data the outline location information on which a positive determination is made by the outline location information accuracy determining unit, when the outline location information accuracy determining unit makes the positive determination, and at a time after the determination, when the positioning timing base unit gives the positioning timing base signal.

(3) In the mobile terminal device according to (1), the environment estimating unit may estimate that the mobile terminal device is currently located in the indoor environment, when already acquired positioning data held at a most recent time in the past out of the positioning data held by the positioning result holding unit is one of the positioning data acquired by the A-GPS positioning operation and the positioning data acquired by the autonomous GPS positioning operation, and when accuracy of a location of the already acquired positioning data does not satisfy a predefined level.

In the mobile terminal device as described above (3), according to the mobile terminal device (1), in particular, the environment estimating unit may estimate that the mobile terminal device is currently located in the indoor environment, when already acquired positioning data held at a most recent time in the past out of the positioning data held by the positioning result holding unit is one of the positioning data acquired by the A-GPS positioning operation and the positioning data acquired by the autonomous GPS positioning operation, and when accuracy of a location of the already acquired positioning data does not satisfy a predefined level.

(4) In the mobile terminal device according to (2), the positioning operation process regulating unit may permit the A-GPS positioning unit to perform the positioning operation process, when the outline location information accuracy determining unit makes a negative determination, and at a time after the determination, when the positioning timing base unit gives the positioning timing base signal.

In the mobile terminal device as described above (4), according to the mobile terminal device (2), in particular, the positioning operation process regulating unit may permit the A-GPS positioning unit to perform the positioning operation process, when the outline location information accuracy determining unit makes a negative determination, and at a time after the determination, when the positioning timing base unit gives the positioning timing base signal.

(5) There is provided a positioning method for selectively performing a plurality of different positioning methods for acquiring location information of a mobile terminal device in a repeated manner to acquire positioning data corresponding to a result of each positioning operation, the positioning method comprising the steps of:

generating a positioning timing base signal to be a basis for specifying a timing of performing the each positioning operation, when the positioning operation is performed in the repeated manner;

performing an A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

performing an autonomous GPS positioning operation without using the GPS assist information at the timing in synchronization with the positioning timing base signal generated;

estimating whether or not the mobile terminal device is currently located in an indoor environment or in an outdoor environment; and regulating implementation of the step of performing the autonomous GPS positioning operation, while performing the A-GPS positioning operation at the timing in synchronization with the positioning timing base signal, when the step of estimating estimates that the mobile terminal device is currently located in the indoor environment, and at a time after the step of estimating, when the positioning timing base signal is generated.

In the positioning method as described above (5), the positioning data corresponding to a result of each positioning operation is acquired by selectively performing a plurality of different positioning methods.

Then, a positioning timing base signal to be a basis is continuously generated for specifying a timing of performing the each positioning operation, when the positioning operation is performed in the repeated manner.

In addition, an A-GPS positioning operation is performed, the A-GPS positioning operation including an assist information acquiring process for acquiring GPS assist information including outline location information of the mobile terminal device in communication with a base transceiver station, and a positioning operation process by use of the GPS assist information acquired by the assist information acquiring process.

Furthermore, an autonomous GPS positioning operation is performed without using the GPS assist information at the timing in synchronization with the positioning timing base signal given by the positioning timing base unit.

Moreover, whether or not the mobile terminal device is currently located in an indoor environment or in an outdoor environment is estimated.

Additionally, implementation of the step of performing the autonomous GPS positioning operation is regulated, while the A-GPS positioning operation is performed at the timing in synchronization with the positioning timing base signal, when the step of estimating estimates that the mobile terminal device is currently located in the indoor environment, and at a time after the step of estimating, when the positioning timing base unit gives the positioning timing base signal.

Advantageous Effects of the Invention

Further power saving is enabled in a mobile terminal device equipped with a GPS positioning function.

DESCRIPTION OF EMBODIMENTS

Hereinafter, embodiments of the present invention will be described in detail with reference to the drawings.

(Configuration of a Mobile Terminal Device as an Embodiment of the Present Invention)

Figure 1:
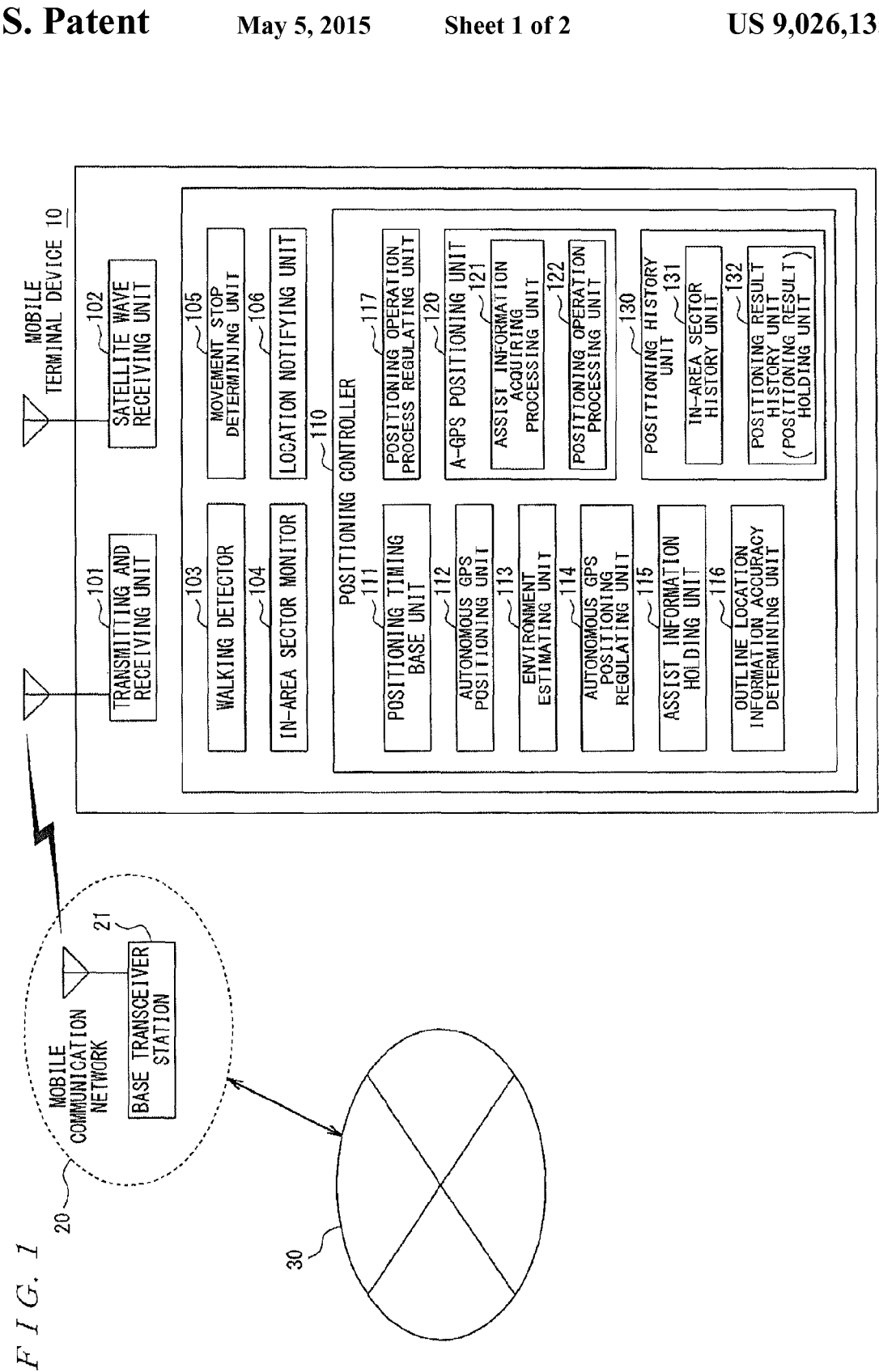
FIG. 1 is a functional block diagram illustrative of a mobile terminal device as an embodiment of the present invention.

FIG. 1 is a functional block diagram illustrative of a mobile terminal device as an embodiment of the present invention.

The mobile terminal device 10 includes: a transmitting and receiving unit 101 for communication with a base transceiver station 21 of a corresponding mobile communication network 20 and a satellite wave receiving unit 102 for receiving signals from a GPS satellite. Specifically, the mobile communication network 20 itself is one network, and, as is known, is connected to another network 30 that is, for example, the Internet.

The mobile terminal device 10 also includes: a walking detector 103 for detecting a user's walking state who has the mobile terminal device 10 by use of an acceleration sensor or the like; an in-area sector monitor 104 for monitoring and specifying an in-area sector; a movement stop determining unit 105 for determining the stop of movement of the mobile terminal device 10 depending on the detection result of the walking detector 103 and the in-area sector information specified by the in-area sector monitor 104; and a location notifying unit 106 for notifying the location information of the mobile terminal device 10 acquired from a positioning result to be described later to the mobile communication network 20 side via the transmitting and receiving unit 101.

The mobile terminal device 10 further includes a positioning controller 110 for performing the positioning operation.

The positioning controller 110 includes: a positioning timing base unit 111; an autonomous GPS positioning unit 112; an environment estimating unit 113; an autonomous GPS positioning regulating unit 114; an assist information holding unit 115; an outline location information accuracy determining unit 116; a positioning operation process regulating unit 117; an A-GPS positioning unit 120; and a positioning history unit 130.

The A-GPS positioning unit 120 includes: an assist information acquiring processing unit 121 for performing an assist information acquiring process; and a positioning operation processing unit 122 for performing a positioning operation process with the use of the GPS assist information acquired by the assist information acquiring processing unit 121.

The positioning history unit 130 includes: an in-area sector history unit 131 for holding an in-area sector history relating to the mobile terminal device 10; and a positioning result history unit (that is a positioning result holding unit) 132 for holding a history of positioning results.

The above-described mobile terminal device 10 is capable of selectively operating plural different positioning operations in a repeated manner for acquiring the location information of the mobile terminal device 10. Herein, the plural different positioning methods denote the A-GPS positioning method and the autonomous GPS positioning method, as will be described later, but includes a simple positioning method for extracting the outline location information (the location information by the outline positioning operation on a cell or sector level) from the assist information to replace the actual positioning operation with the information acquired by extraction as the GPS positioning result.

The positioning timing base unit 111 gives a positioning timing base signal to be the basis for specifying the timing of performing each positioning operation, when the positioning operation is performed in a repeated manner as described above.

In addition, the positioning result history unit 132 of the positioning history unit 130 at least temporarily holds the positioning data corresponding to the above-described each positioning result (that is the positioning data acquired by the actual positioning operation and the outline location information with which the actual positioning operation is replaced).

The A-GPS positioning unit 120 performs the A-GPS positioning operation at a timing in synchronization with the positioning timing base signal given by the positioning timing base unit 111. The A-GPS positioning operation includes following processes. There are an assist information acquiring process, by the assist information acquiring processing unit 121, for acquiring the GPS assist information including the outline location information of the mobile terminal device 10 by communicating with the base transceiver station 21 via the transmitting and receiving unit 101, and a positioning operation process, by the positioning operation processing unit 122, for utilizing the GPS assist information acquired in the assist information acquiring process.

In addition, the environment estimating unit 113 estimates that the mobile terminal device is currently located in an indoor environment or in an outdoor environment.

Then, when the environment estimating unit 113 estimates that the mobile terminal device is currently located in the indoor environment, and at a time after the estimation, when the positioning timing base unit 111 gives a positioning timing base signal, the autonomous GPS positioning regulating unit 114 regulates the implementation of the autonomous GPS positioning operation by the autonomous GPS positioning unit 112, and causes the A-GPS positioning unit 120 to perform the A-GPS positioning operation (in this case, that is an assist information acquiring process by the assist information acquiring processing unit 121, in the A-GPS positioning unit 120).

According to an aspect of the present invention, the mobile terminal device 10 with the above-described configuration is further provided with: the assist information holding unit 115; the outline location information accuracy determining unit 116; and the positioning operation process regulating unit 117.

The assist information holding unit 115 holds the GPS assist information acquired in the above-described assist information process in the A-GPS positioning unit 120.

Moreover, the outline location information accuracy determining unit 116 determines whether or not the accuracy of the location in the outline location information of the mobile terminal device included in the GPS assist information held by the assist information holding unit 115 satisfies a predefined level. Herein, the predefined level means a positioning level 3 or higher. Specifically, the positioning level 3 has the level of accuracy in which an error range is narrower than approximately 50 meters, namely almost precise location information. Additionally, the positioning level 2 is a level in which the error range is narrower than approximately 300 meters, namely comparatively precise location information. Furthermore, the positioning level 1 is a level in which the error range is equal to or wider than approximately 300 meters, namely rough location information.

When the outline location information accuracy determining unit 116 makes a positive determination (an example is the determination of the positioning level 3 or higher), and at a time after the determination, when the positioning timing base unit 111 gives the positioning timing base signal, the positioning operation process regulating unit 117 regulates the implementation of the positioning operation process by the positioning operation processing unit 122 in the A-GPS positioning unit 120, and also causes the positioning result history unit 132 to hold as the positioning data the outline location information on which the positive determination is made by the outline location information accuracy determining unit 116.

In addition, according to an aspect of the present embodiment, the environment estimating unit 113 estimates that the mobile terminal device is currently located in the indoor environment, when the already acquired positioning data held at the most recent time out of the positioning data held by the positioning result history unit 132 is one of the A-GPS positioning data acquired by the A-GPS positioning unit 120 and the autonomous GPS positioning data acquired by the autonomous GPS positioning unit 112, and when the accuracy of the location of the already acquired positioning data does not satisfy the predefined level.

Herein, the indoor environment denotes, for example, an environment where multiple small-sized base transceiver stations are provided at a comparatively narrow space for covering a relatively narrow and small area as compared to the outdoor environment. Underground parking, restaurant, shopping mall, upper floor of a building, and the like correspond to the above environment, in most cases.

When the outline location information accuracy determining unit 116 makes a negative determination (an example is the determination of not satisfying the positioning level 3), and at a time after the determination, when the positioning timing base unit 111 gives the positioning timing base signal, the positioning operation process regulating unit 117 permits the positioning operation processing unit 122 of the A-GPS positioning unit 120 to perform the positioning operation process.

(Operations of Mobile Terminal Device as an Embodiment of the Present Invention)

Operations of a mobile terminal device will be described as an embodiment of the present invention, with reference to the drawings.

Figure 2:
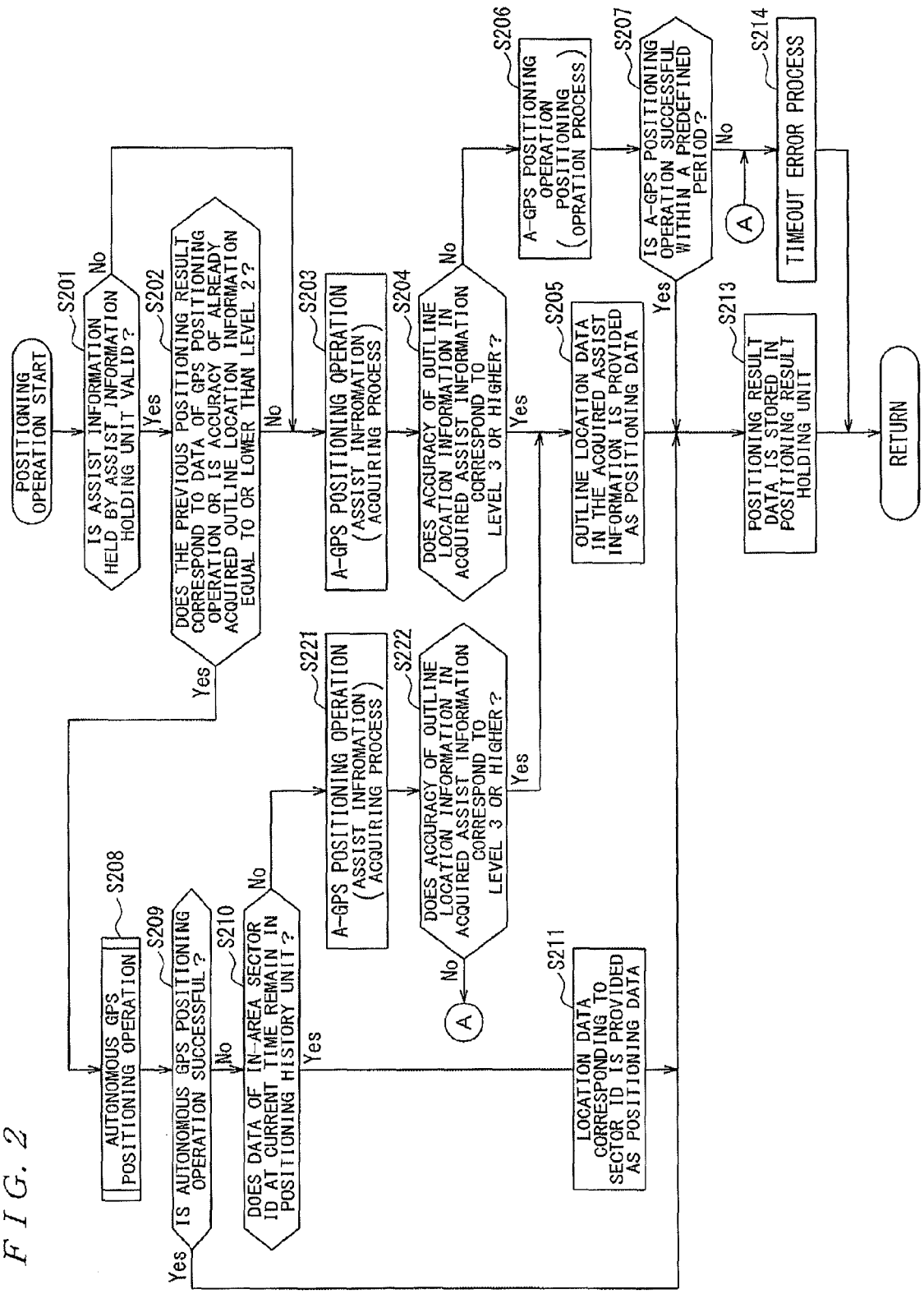
FIG. 2 is a flowchart illustrative of operations of the mobile terminal device of FIG. 1.

FIG. 2 is a flowchart illustrative of operations of the mobile terminal device of FIG. 1.

When the mobile terminal device starts operating, although not illustrated, a time-keeping operation for giving the above-described positioning timing base signal progresses at the positioning timing base unit 111, as a background process.

In performing the positioning operation based upon the positioning timing base signal, firstly, it is determined whether or not the assist information (including the outline location information) held by the assist information holding unit 115 is valid (step S201).

At step S201, when the assist information held by the assist information holding unit 115 is determined to be valid (step S201: Yes), then, it is determined whether the previous positioning result corresponds to the data of the GPS positioning operation or the accuracy of the already acquired outline location information is equal to or lower than the level 2 (step S202).

When it is determined that the previous positioning result corresponds to the data of the GPS positioning operation at step S202, which means that the mobile terminal device is located in the outdoor environment where the GPS positioning operation is performed effectively at the previous time. At the current time proximate in time to the time when the previous positioning operation is performed, there is a high possibility that the state has not changed yet. Therefore, the estimation result is acquired such that the mobile terminal device is still now located in the outdoor environment.

In addition, when it is determined that the accuracy of the already acquired (most recently in the past) outline location information held by the positioning result history unit 132 is equal to or lower than the level 2, which means that there is a high possibility that the mobile terminal device is located in the outdoor environment where the location accuracy representing the outline location information is relatively low, as the density of providing the base transceiver stations is lower than that in the indoor environment. Therefore, the estimation result is acquired such that the mobile terminal device is located in the outdoor environment.

Specifically, in the estimation process of estimating whether the mobile terminal device is currently located in indoor or outdoor, the estimation result is acquired as described above by focusing on the above-described situation, not only depending on whether the mobile terminal device is actually located in indoor or outdoor but also effectively differentiating whether the location is regarded as indoor or outdoor.

The above-described determination at step S202 is performed by the environment estimating unit 113 of the positioning controller 110.

At step S202, when it is determined that the mobile terminal device is located in the indoor environment (step S202: No), then, the assist information acquiring process that is a first step process in the A-GPS positioning operation is performed (step S203).

The assist information acquired in the assist information acquiring process at step S203 is held at the assist information holding unit 115.

The processes from step S202 to step S203, in other words, are processes of regulating the implementation of the autonomous GPS positioning operation by the autonomous GPS positioning unit 112 to perform the assist information acquiring process that is the first step (step S203) in the A-GPS positioning operation, when the mobile terminal device 10 is estimated to be located in the indoor environment at step S202 (step S202: No), and at a time after the estimation, when the positioning timing base unit 111 gives the positioning timing base signal. Then, the above-described processes from step S202 to step S203 are performed by the autonomous GPS positioning regulating unit 114.

Subsequently, as to the outline location information in the assist information held by the assist information holding unit 115, it is determined whether or not the accuracy of the location thereof corresponds to the above-described level 3 or higher (step S204).

When the determination result is a positive one, that is when it is determined that the accuracy of location by the outline location information in the assist information held by the assist information holding unit 115 corresponds to the above-described level 3 or higher (step S204: Yes), at a time after the determination, when the positioning timing base unit 111 gives the positioning timing base signal, the implementation of the positioning operation process by the A-GPS positioning unit 120 (the positioning operation processing unit 122 thereof) is regulated, and in addition, the outline location information on which the positive determination is made by the outline location information accuracy determining unit 116 is provided as current positioning data (step S205) to store this data in the positioning result history unit 132 (step S213).

The process at step S205 is performed by the positioning operation process regulating unit 117.

On the other hand, when the determination result at step S204 is a negative one, that is when it is determined that the accuracy of location by the outline location information in the assist information held by the assist information holding unit 115 does not correspond to the above-described level 3 or higher (step S204: No), the A-GPS positioning unit 120 (the positioning operation processing unit 122 thereof) performs the positioning operation process (step S206), when the positioning timing base unit 111 gives the positioning timing base signal.

Next, it is determined whether or not the positioning operation process performed at step S206 is successful within a predefined period of time, within 10 seconds, for example (step S207).

At step S207, when it is determined that the A-GPS positioning operation is successful within a predefined period of time (step S207: Yes), the positioning result data by the A-GPS positioning operation is stored in the positioning result history unit 132 (step S213).

On one hand, at step S207, when the positioning result cannot be acquired by the A-GPS positioning operation at step S206 within the predefined period of time and a failure is determined (step S207: No), a timeout error process is performed (step S214) to suppress wasteful power consumption.

On the other hand, at the above-described step S202, when it is not determined that the previous positioning result corresponds to the data of the GPS positioning operation or the accuracy of the already acquired outline location information held by the positioning result history unit 132 is equal to or lower than the level 2, there is a high possibility that the mobile terminal device 10 is located in the outdoor environment as described above. Therefore, the estimation result is acquired such that the mobile terminal device is located in the outdoor environment (step S202: Yes).

When it is determined that the mobile terminal device is located in the outdoor environment (step S202: Yes), the GPS positioning operation is effective and the autonomous GPS positioning operation is performed (step S208). That is, only when there is a high possibility that the mobile terminal device is located in the outdoor environment where the autonomous GPS positioning operation is effective, the implementation of the autonomous GPS positioning operation is permitted. When it is determined that the mobile terminal device is located in the indoor environment (step S202: No) as described above, the wasteful implementation of the autonomous GPS positioning operation for drastically consuming the power is suppressed. Accordingly, there are significant effects in power saving in the mobile terminal device 10.

Subsequently, it is determined whether or not the autonomous GPS positioning operation performed at step S208 is successful (step S209).

When the determination result at step S209 is a negative one, that is when it is determined that the autonomous GPS positioning operation fails (step S209: No), at a time after the determination, when the positioning timing base unit 111 gives the positioning timing base signal, the positioning operation process by the A-GPS positioning unit 120 is regulated, and in addition it is determined whether or not the data of the in-area sector ID at the current time of the mobile terminal device 10 remains in the in-area sector history unit 131 of the positioning history unit 130 (step S210).

When the positive determination result is acquired in the determination at step S210, that is when the data of the in-area sector ID at the current time of the mobile terminal device 10 remains in the in-area sector history unit 131 of the positioning history unit 130 (step S210: Yes), the location data corresponding to the sector ID held by the in-area sector history unit 131 is provided as the positioning data (step S211) and this data is stored in the positioning result history unit 132 (step S213).

In addition, when the negative determination result is acquired in the determination at step S210, that is when the data of the in-area sector ID at the current time of the mobile terminal device 10 does not remain in the in-area sector history unit 131 of the positioning history unit 130 (step S210: No), the assist information acquiring process that is the first step process in the A-GPS positioning operation (step S221).

The assist information acquired in the assist information acquiring process at step S221 is held by the assist information holding unit 115.

Next, as to the outline location information in the assist information held by the assist information holding unit 115, it is determined whether or not the accuracy of the location corresponds to the above-described level 3 or higher (step S222).

When the determination result at step S222 is a positive one, that is when it is determined that the accuracy of the location by the outline location information in the assist information held by the assist information holding unit 115 corresponds to the above-described level 3 or higher (step S222: Yes), at a time after the determination, when the positioning timing base unit 111 gives the positioning timing base signal, the implementation of the positioning operation process by the A-GPS positioning unit 120 (the positioning operation processing unit 122 thereof) is regulated, and in addition the outline location information on which the positive determination is made by the outline location information accuracy determining unit 116 is provided as the current positioning data (step S205) and this data is stored in the positioning result history unit 132 (step S213).

Further, when the determination result at step S222 is a negative one, that is when it is determined that the accuracy of the location by the outline location information in the assist information held by the assist information holding unit 115 does not satisfy the above-described level 3 (step S222: No), the timeout error process is performed (step S214) to suppress wasteful power consumption.

On the other hand, when the determination result at step S209 is a positive one, that is when it is determined that the autonomous GPS positioning operation is successful (step S209: Yes), the positioning data acquired by the autonomous GPS positioning operation is stored in the positioning result history unit 132 (step S213).

Specifically, in the above example, at step S207, when the positioning result by the A-GPS positioning operation at step S206 is not acquired within a predefined period and a failure is determined (step S207: No), the timeout error process is performed (step S214). However, instead of going to step S214, the processing may move to the above-described step S205 from step S207 (when the determination result is No) to provide the outline location data in the already acquired assist information at step S203 as the positioning data.

Moreover, in the above example, when the current data of the in-area sector ID does not remain in the positioning history unit 130 at step S210 (step S210: No), the assist information acquiring process that is the first step process in the A-GPS positioning operation is performed (step S221), and then the suitability (accuracy) of the outline location information in the assist information acquired at step S221 is determined (step S222). However, the outline location data acquired at step S221 may be immediately provided as the positioning data without moving to step S222.

Heretofore, the present invention has been described in detail by the embodiments of the present invention. The scope of the present invention, however, is not limited to the exemplary embodiments illustrated in the drawings and described, but includes all embodiments that bring equivalent effects at which the present invention aims. Moreover, the scope of the present invention is not limited to combinations of features of the invention defined by claim 1, but may include all desired combinations of features described heretofore.

REFERENCE SIGNS LIST

10 mobile terminal device
20 mobile communication network
21 base transceiver station
30 network
101 transmitting and receiving unit
102 satellite wave receiving unit
103 walking detector
104 in-area sector monitor
105 movement stop determining unit
106 location notifying unit
110 positioning controller
111 positioning timing base unit
112 autonomous GPS positioning unit
113 environment estimating unit
114 autonomous GPS positioning regulating unit
115 assist information holding unit
116 outline location information accuracy determining unit
117 positioning operation process regulating unit
120 A-GPS positioning unit
121 assist information acquiring processing unit
122 positioning operation processing unit
130 positioning history unit
131 in-area sector history unit
132 positioning result history unit

The invention claimed is:

1. A mobile terminal device capable of selectively performing a plurality of different positioning methods for acquiring location information of the mobile terminal device in a repeated manner,
the mobile terminal device comprising:
a positioning timing base unit for giving a positioning timing base signal to be a basis for specifying a timing of performing each positioning operation, when the positioning operation is performed in the repeated manner;
a positioning result holding unit for at least temporarily holding positioning data corresponding to a result of the each positioning operation;
an A-GPS positioning unit for performing an A-GPS positioning operation at the timing in synchronization with the positioning timing base signal given by the positioning timing base unit, the A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

an autonomous GPS positioning unit for performing an autonomous GPS positioning operation without using the GPS assist information at the timing in synchronization with the positioning timing base signal given by the positioning timing base unit;

an environment estimating unit for estimating whether or not the mobile terminal device is currently located in an indoor environment or in an outdoor environment;

an autonomous GPS positioning regulating unit for regulating implementation of the autonomous GPS positioning operation by the autonomous GPS positioning unit to cause the A-GPS positioning unit to perform the assist information acquiring process of the A-GPS positioning operation, when the environment estimating unit estimates that the mobile terminal device is currently located in the indoor environment, and at a time after the estimation, when the positioning timing base unit gives the positioning timing base signal;

an assist information holding unit for holding the GPS assist information acquired by the assist information acquiring process by the A-GPS positioning unit;

an outline location information accuracy determining unit for determining whether or not accuracy of a location of the outline location information of the mobile terminal device included in the GPS assist information held by the assist information holding unit satisfies a predefined level; and a positioning operation process regulating unit for regulating implementation of the positioning operation process by the A-GPS positioning unit and causing the positioning result holding unit to hold as the positioning data the outline location information on which a positive determination is made by the outline location information accuracy determining unit, when the outline location information accuracy determining unit makes the positive determination, and at a time after the determination, when the positioning timing base unit gives the positioning timing base signal.

2. A mobile terminal device capable of selectively performing a plurality of different positioning methods for acquiring location information of the mobile terminal device in a repeated manner, the mobile terminal device comprising:

a positioning timing base unit for giving a positioning timing base signal to be a basis for specifying a timing of performing each positioning operation, when the positioning operation is performed in the repeated manner;

a positioning result holding unit for at least temporarily holding positioning data corresponding to a result of the each positioning operation;

an A-GPS positioning unit for performing an A-GPS positioning operation at the timing in synchronization with the positioning timing base signal given by the positioning timing base unit, the A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

an autonomous GPS positioning unit for performing an autonomous GPS positioning operation without using the GPS assist information at the timing in synchronization with the positioning timing base signal given by the positioning timing base unit;

an environment estimating unit for estimating whether or not the mobile terminal device is currently located in an indoor environment or in an outdoor environment; and an autonomous GPS positioning regulating unit for regulating implementation of the autonomous GPS positioning operation by the autonomous GPS positioning unit to cause the A-GPS positioning unit to perform the assist information acquiring process of the A-GPS positioning operation, when the environment estimating unit estimates that the mobile terminal device is currently located in the indoor environment, and at a time after the estimation, when the positioning timing base unit gives the positioning timing base signal;

wherein the environment estimating unit estimates that the mobile terminal device is currently located in the outdoor environment, when already acquired positioning data held at a most recent time in the past out of the positioning data held by the positioning result holding unit is one of the positioning data acquired by the A-GPS positioning operation and the positioning data acquired by the autonomous GPS positioning operation, and when accuracy of a location of the already acquired positioning data does not satisfy a predefined level.

3. The mobile terminal device according to claim 1, wherein the positioning operation process regulating unit permits the A-GPS positioning unit to perform the positioning operation process, when the outline location information accuracy determining unit makes a negative determination, and at a time after the determination, when the positioning timing base unit gives the positioning timing base signal.

4. A positioning method for selectively performing a plurality of different positioning methods for acquiring location information of a mobile terminal device in a repeated manner to acquire positioning data corresponding to a result of each positioning operation, the positioning method comprising the steps of:

generating a positioning timing base signal to be a basis for specifying a timing of performing the each positioning operation, when the positioning operation is performed in the repeated manner;

at least temporarily holding positioning data corresponding to a result of the each positioning operation;

performing an A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

performing an autonomous GPS positioning operation without using the GPS assist information at the timing in synchronization with the positioning timing base signal generated;

estimating whether or not the mobile terminal device is currently located in an indoor environment or in an outdoor environment;

regulating implementation of the step of performing the autonomous GPS positioning operation, while performing the A-GPS positioning operation at the timing in synchronization with the positioning timing base signal, when the step of estimating estimates that the mobile terminal device is currently located in the indoor environment, and at a time after the step of estimating, when the positioning timing base signal is given;

holding the GPS assist information acquired by the assist information acquiring process in the A-GPS positioning operation;

determining whether or not accuracy of a location of the outline location information of the mobile terminal device included in the GPS assist information held in the step of holding satisfies a predefined level; and regulating implementation of the positioning operation process in the performing step of performing the A-GPS positioning operation and causing the step of at least temporarily holding the GPS assist information to hold as the positioning data the outline location information on which a positive determination is made in the step of determining, when the positive determination is made in the step of determining, and at a time after the determination, when the positioning timing base signal is given in the step of generating the positioning timing base signal.

5. A positioning method for selectively performing a plurality of different positioning methods for acquiring location information of a mobile terminal device in a repeated manner to acquire positioning data corresponding to a result of each positioning operation, the positioning method comprising the steps of:

generating a positioning timing base signal to be a basis for specifying a timing of performing the each positioning operation, when the positioning operation is performed in the repeated manner;

at least temporarily holding positioning data corresponding to a result of the each positioning operation;

performing an A-GPS positioning operation including an assist information acquiring process for acquiring GPS assist information including outline location information of the mobile terminal device in communication with a base transceiver station, and a positioning operation process by use of the GPS assist information acquired by the assist information acquiring process;

performing an autonomous GPS positioning operation without using the GPS assist information at the timing in synchronization with the positioning timing base signal generated;

estimating whether or not the mobile terminal device is currently located in an indoor environment or in an outdoor environment; and regulating implementation of the step of performing the autonomous GPS positioning operation, while performing the A-GPS positioning operation at the timing in synchronization with the positioning timing base signal, when the step of estimating estimates that the mobile terminal device is currently located in the indoor environment, and at a time after the step of estimating, when the positioning timing base signal is given;

wherein in the step of estimating, it is estimated that the mobile terminal device is currently located in the outdoor environment, when already acquired positioning data held at a most recent time in the past out of the positioning data held in the step of holding is one of the positioning data acquired by the A-GPS positioning operation and the positioning data acquired by the autonomous GPS positioning operation, and when accuracy of a location of the already acquired positioning data does not satisfy a predefined level.

* * * * *